United States Patent
Subramaniam et al.

(10) Patent No.: US 11,438,747 B1
(45) Date of Patent: Sep. 6, 2022

(54) SYSTEMS AND METHODS FOR DEVICE TRAFFIC STEERING USING EDGE DNS MEDIATION SERVICE (EDMS)

(71) Applicant: Verizon Patent and Licensing Inc., Basking Ridge, NJ (US)

(72) Inventors: Ramanathan Subramaniam, Old Bridge, NJ (US); Brian Matthew White, Port Murray, NJ (US); Wujun Qie, Needham, MA (US); Ning Zhang, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/210,897

(22) Filed: Mar. 24, 2021

(51) Int. Cl.
*H04W 4/70* (2018.01)
*H04W 76/11* (2018.01)
*H04W 4/029* (2018.01)
*H04W 60/00* (2009.01)
*H04L 61/4511* (2022.01)

(52) U.S. Cl.
CPC ........... *H04W 4/70* (2018.02); *H04L 61/4511* (2022.05); *H04W 4/029* (2018.02); *H04W 60/00* (2013.01); *H04W 76/11* (2018.02)

(58) Field of Classification Search
CPC ....... H04W 4/70; H04W 76/11; H04W 60/00; H04W 4/029; H04W 4/02; H04W 88/18; H04W 88/00; H04W 88/02; H04W 88/08; H04W 72/00; H04W 76/10; H04W 72/02; H04W 72/005; H04W 72/04; H04W 60/02; H04W 48/18; H04W 48/20; H04W 8/18; H04W 8/20; H04W 4/50; H04L 29/12; H04L 61/4511; H04L 65/1023; H04L 65/1026; H04L 65/103; H04L 65/1033; H04L 65/1036; H04L 65/104; H04L 61/45

See application file for complete search history.

(56) References Cited

U.S. PATENT DOCUMENTS

| | | | |
|---|---|---|---|
| 10,230,684 B2 * | 3/2019 | Zheng | H04L 61/15 |
| 10,574,670 B1 * | 2/2020 | Verma et al. | H04L 63/1408 |
| 2019/0394061 A1 * | 12/2019 | Chen et al. | H04L 12/2814 |
| 2020/0136906 A1 * | 4/2020 | Guim Bernat et al. | H04L 41/0843 |
| 2020/0228623 A1 * | 7/2020 | Weissman et al. | H04L 67/32 |
| 2021/0314391 A1 * | 10/2021 | Lee et al. | H04L 67/1008 |

FOREIGN PATENT DOCUMENTS

| | | | | | |
|---|---|---|---|---|---|
| CN | 113285932 A | * | 8/2021 | | G06F 21/56 |
| DE | 112020000054 T5 | * | 3/2021 | | H04L 29/08 |

* cited by examiner

*Primary Examiner* — Meless N Zewdu

(57) ABSTRACT

A method may include storing, at a network device, a user device identifier associated with a user device that has subscribed to access an edge service, an edge service identifier associated with the edge service, and an edge device identifier associated with an edge device at an edge network to provide the edge service; receiving, at the network device, a request to access the edge service, wherein the request includes the user device identifier and the edge service identifier; performing, by the network device, a lookup to determine the edge device identifier; and transmitting, by the network device and to the user device, the edge device identifier for accessing the edge service at the edge device.

20 Claims, 5 Drawing Sheets

SYSTEMS AND METHODS FOR DEVICE TRAFFIC STEERING USING EDGE DNS MEDIATION SERVICE (EDMS)

BACKGROUND INFORMATION

Today many Internet of Things (IoT) solutions take advantage of computing and storage facilities available in the cloud. The IoT devices may collect information about surrounding environments and report the information to an application residing in the cloud. Since the IoT devices communicate over long distance, high-latency links, the application may experience significant latency when receiving the information. Therefore, in some cases, using the computing and storage facilities in the cloud may not be practical.

DETAILED DESCRIPTION OF PREFERRED EMBODIMENTS

Figure 1:
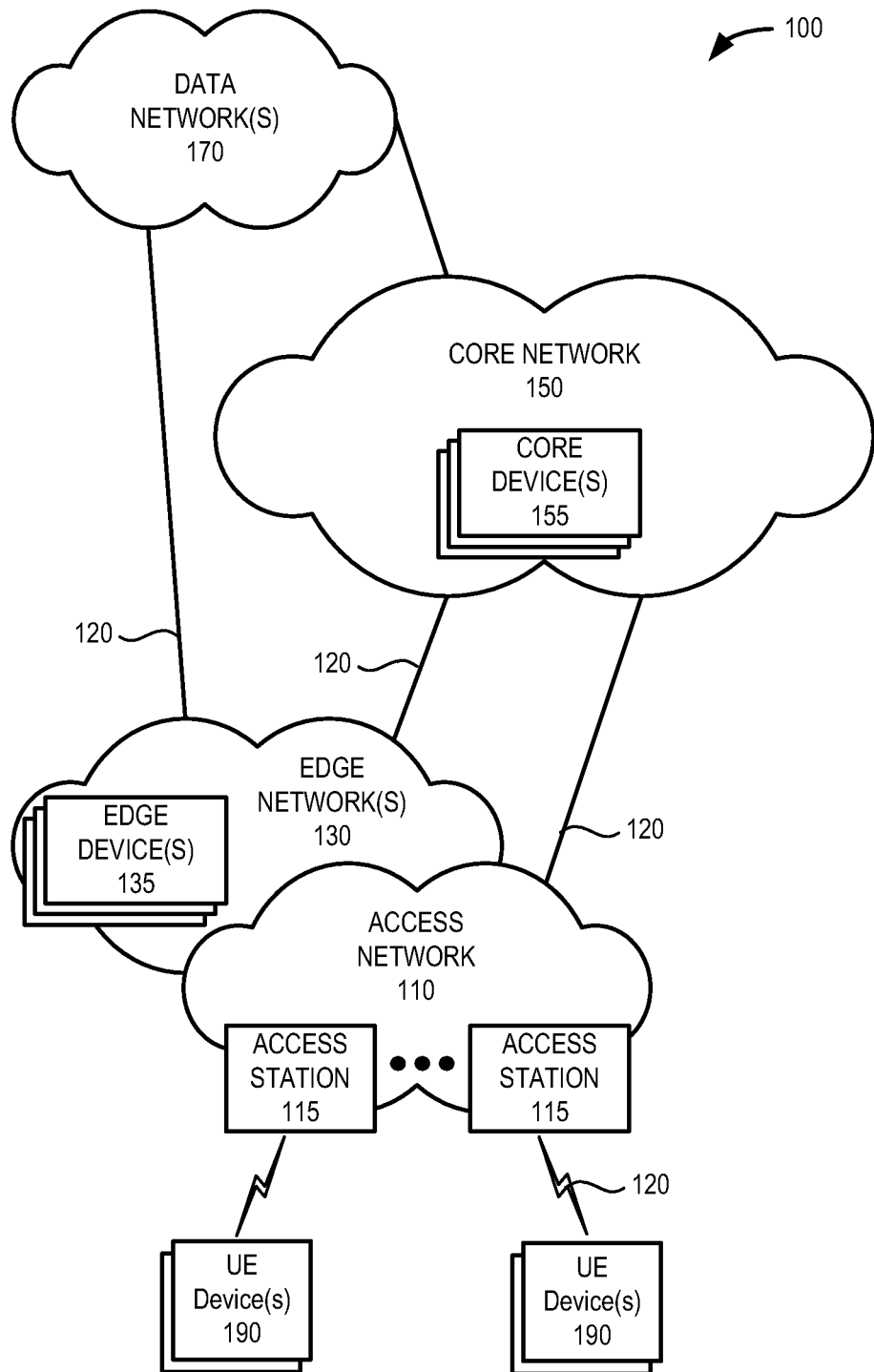
FIG. 1 is a diagram illustrating a network environment according to an implementation described herein.

The following detailed description refers to the accompanying drawings. The same reference numbers in different drawings identify the same or similar elements.

Client devices, such as IoT devices, may be equipped with an array of sensors (e.g., temperature sensors, light sensors, power sensors, etc.) through which the client devices may collect information about their surrounding environments. The client devices may report sensor readings (e.g., at regular intervals, when certain criteria are met, etc.) to applications residing in a cloud (referred to herein as the cloud or the far cloud). The applications in the cloud may process the readings and, based on the readings, may interact with devices (e.g., devices equipped with actuators) to perform actions and/or to generate notifications/alerts to users monitoring the system.

The client devices may access Domain Name Service (DNS) systems to convert known Universal Resource Locators (URLs) into Internet Protocol (IP) addresses of the service instances. For example, a unique URL or fully qualified domain name (FQDN) may be associated with a service and the client device may access the DNS system to convert a URL associated with a service to an IP address. To provide a high availability of service instances and for supporting geo-redundancy, multiple instances of the service components may be deployed across multiple data centers. The DNS systems used by the devices to resolve the URLs into IP addresses may be used to steer the traffic to the most appropriate instance.

To interact with the applications in the far cloud, the client devices may communicate over long-distance, high-latency links over the Internet. Due to the high latency and propagation delay experienced from communicating with the far cloud, many client devices may not be able to use the compute and storage facilities in the far cloud since applications may require at least one of low latency, a need to reduce bandwidth toward the core network, and/or address privacy and/or other geographic/regulatory constraints. Edge computing with the evolution of the Fifth Generation (5G) network may bring computing, storage, networking, and management services closer to locations where data is being generated. With the evolution of 5G networks, latency is significantly lowered by use of edge computing. The computing resources at the edge are referred to herein as edge or edge cloud or Multi-access Edge Computing (MEC) platform. Components in the far cloud may collaborate with components in the edge cloud to form a large-scale distributed system and support or facilitate client device needs that could not be supported by the far cloud alone.

With the availability of computing resources at the edge, applications can be moved to the edge cloud client, thus enabling customers to subscribe to services offered at the edge and realize solutions that could not be addressed earlier. The client devices may interact with applications in the edge rather than in the far cloud. However, not all edge instances may be best suited to provide services to a client device or user equipment (UE) device. Therefore, it may be necessary to determine an optimal edge instance where a device may be steered to access a particular service.

In one solution for steering traffic to optimal edge instances, devices may be enhanced to include a Cloud Enablement Client (CEC) that interacts with the far cloud to facilitate determination of an optimal edge or Multi-access Edge Computing (MEC) platform for providing a service. The CEC in the device may collaborate with a Cloud Discovery Proxy (CDP) in the far cloud, which may access an Edge Discovery Service to determine the optimal cloud instance. The CDP may determine the edge that is best suited to serve the device based on attributes of the device, such as UE identity (e.g., IP address, Mobile Station International Subscriber Directory Number (MSISDN) International Mobile Equipment Identity (IMEI), Mobile Directory Number (MDN), cell identifier (ID), Generic Public Subscription Identifier (GPSD), region, service ID (augmented reality (AR), virtual reality (VR), gaming, IoT, etc.), re subscribers density, etc. Based on determining the edge best suited to serve the dev the CDP may provision the edge instance to serve the device and nay configure the device to enable the device to access services from the edge instance.

In another solution, traffic steering maybe accomplished by associating separate FQDNs depending upon whether the service is located in the edge instances or far cloud instances. For example, in one scenario, the same FQDN may be used to designate a service across all edge instances. In this scenario, the FQDN used across the edge instances may be distinct from the FQDN used for the same service in the far cloud instance. In a second scenario, unique FQDNs may be used to designate the service across edge instances. In both scenarios, the client or UE device may need to be modified to facilitate the device for accessing services from the edge instances. In addition, the above solution to traffic steering requires the client or UE device to participate in the optimal edge determination process.

Implementations described herein provide for traffic steering from a UE device to an application on an edge network. Implementations described herein provide for selection of an optimal edge instance without requiring a device or user equipment to participate in the determination of the optimal edge. According to implementations described herein, the configuration in the device may be the same regardless of cloud instances from where the device is being served. For example, the FQDN being used to designate a service may be the same whether the device is being served from the far cloud instance or an edge instance.

Implementations described herein may utilize an edge DNS mediation service (EDMS) to process DNS requests from devices that are to be served by an edge device. For example, the EDMS may store an identity of a client device, an identifier associated with a service located on an edge, and an IP address associated with the service at a given edge where the service is located. The EDMS may be provisioned by an edge provisioning agent based on determining an optimal edge for serving the client device. According to implementations described herein, when a client device initiates a DNS request to access services located on an edge, the EDMS may intercept the DNS request and may respond directly without accessing a DNS system in the far cloud and thereby facilitate routing of the traffic from the device to the edge based on the information stored in the EDMS. In this way, traffic may be routed to an edge without accessing a DNS system on the far cloud and without relying on an application or client stored on the device to steer traffic to the edge device.

FIG. 1 is a diagram illustrating an exemplary environment 100 in which an exemplary embodiment of routing traffic to an edge device may be implemented. As illustrated, environment 100 includes an access network 110, edge networks 130, a core network 150, and one or more data networks 170. Access network 110 includes access stations 115, edge network 130 includes edge devices 135, and core network 150 includes core devices 155. Environment 100 further includes UE devices 190.

The number, the type, and the arrangement of network devices and the number of UE devices 190 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between UE devices 190 and the network devices. Environment 100 may be implemented to include wired, optical, and/or wireless communication links 120 among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 110 may include one or multiple networks of one or multiple types and technologies. For example, access network 110 may include a Fifth Generation (5G) radio access network (RAN), Fourth Generation (4G) RAN, and/or another type of future generation RAN. By way of further example, access network 110 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 110 may further include other types of wireless networks, such as a WiFi network, a Worldwide Interoperability for Microwave Access (WiMAX) network, a local area network (LAN), or another type of network that may provide an on-ramp to access stations 115 and/or core network 150.

Depending on the implementation, access network 110 may include one or multiple types of access stations 115. For example, access station 115 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 110 may be implemented according to various wireless technologies (e.g., radio access technology (RAT), etc.), wireless standards, wireless frequencies/bands, and so forth. According to an implementation, access stations 115 may include a gNB with multiple distributed components, such as a central unit (CU), a distributed unit (DU), a remote unit (RU or a remote radio unit (RRU)), or another type of distributed arrangement. Access stations 115 (as part of access network 110) may be part of a Self-Organizing Network (SON) that may be reconfigured by another component in networks 110, 130, and/or 150.

Edge network 130 includes a platform that provides application services at the edge of a network, such as application services for UE devices 190. For example, edge network 130 may be implemented as a Multi-access Edge Compute (MEC) platform. Edge network 130 may be implemented using one or multiple technologies including, for example, network function virtualization (NFV), software defined networking (SDN), cloud computing, or another type of network technology. Edge network 130 may include network devices (e.g., edge devices 135) located to provide geographic proximity to various groups of access stations 115. In one embodiment, edge device 135 may include an edge provisioning agent. In some embodiments, components of edge network 130 may be co-located with access station 115 in access network 110. In other embodiments, access stations 115 may connect to edge network 130 via wired (e.g., optical) backhaul links 120.

Core network 150 may include one or multiple networks of one or multiple types and technologies. According to an exemplary embodiment, core network 150 includes a complementary network associated with access network 110. For example, core network 150 may be implemented to include a next generation core (NGC) for a 5G network. In other implementations, core network 150 may also include an Evolved Packet Core (EPC) of an LTE, a core network of an LTE-Advanced (LTE-A) network, and/or a core network of an LTE-A Pro network. Core network 150 may also include a legacy core network.

Depending on the implementation, core network 150 may include various types of network devices, such as core devices 155. For example, core devices 155 may include 5G core components and/or combined 4G/5G core components, such as a packet gateway (PGW), a serving gateway (SGW), a home subscriber server (HSS), an authentication, authorization, and accounting (AAA) server, a policy charging and rules function (PCRF), a charging system (CS), a user plane function (UPF), an Access and Mobility Management Function (AMF), a mobility and management entity (MME), a session management function (SMF), a unified data management (UDM) device, an authentication server function (AUSF), a network slice selection function (NSSF), a network repository function (NRF), a Policy Control Function (PCF), a network exposure function (NEF), and/or an application function (AF). According to other exemplary implementations, core devices 155 may include additional, different, and/or fewer network devices than those described. For example, core devices 155 may include a non-standard and/or proprietary network device.

Data network 170 may include one or multiple networks. For example, data network 170 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 170 may include various network devices that provide various applications, services, or other type of UE device assets (e.g., servers (e.g., web, application, cloud, etc.), mass storage devices, data center devices), and/or other types of network services pertaining to various network-related functions. In one implementation, data network 170 may include a far cloud, a CDP-DPA, an EDMS, and/or an edge discovery service (EDS).

UE devices 190 may each include a mobile device, such as wireless or cellular telephone device (e.g., a conventional cell phone with data processing capabilities), a smart phone, a personal digital assistant (PDA) that can include a radiotelephone, etc. In another implementation, UE device 190 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE devices 190 may be implemented as a machine-type communications (MTC) device, an IoT device, a machine-to-machine (M2M) device, etc., that includes communication functionality, such as a home appliance device, a home monitoring device, a camera, etc. UE devices 190 may connect to access stations 115 in a wireless manner. As described further herein, UE device 190 may access edge network 130 to access services (e.g., services provided by edge devices 135).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
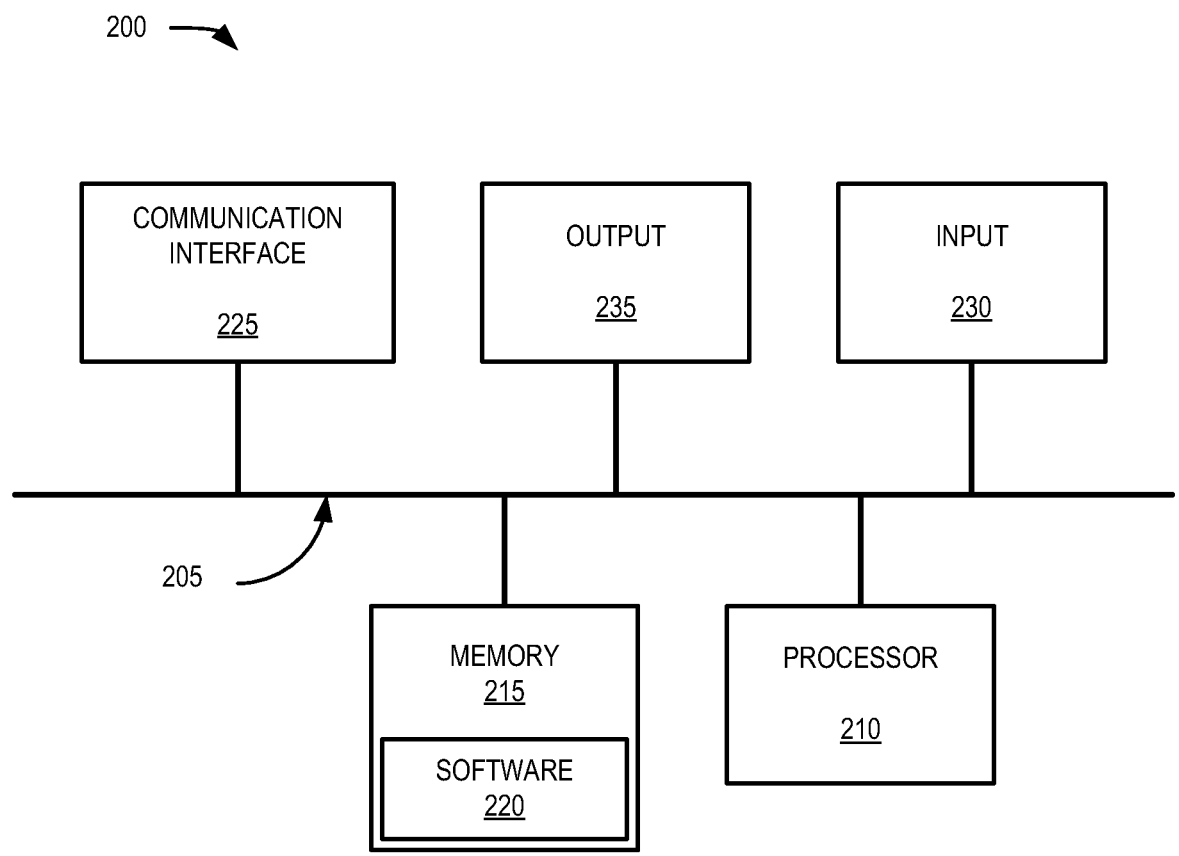
FIG. 2 is a diagram of exemplary components that may be included in one or more of the devices shown in FIG. 1.

FIG. 2 is a diagram illustrating exemplary components of a device 200 that may correspond to one or more of the devices described herein. For example, device 200 may correspond to components included in UE device 190, access station 115, edge devices 135, core devices 155, and/or other components of access network 110, edge network 130, core network 150, and/or data network 170 described below. As illustrated in FIG. 2, according to an exemplary embodiment, device 200 includes a bus 205, a processor 210, a memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include a drive for reading from and writing to the storage medium.

Memory/storage 215 may be external to and/or removable from device 200, such as, for example, a Universal Serial Bus (USB) memory stick, a dongle, a hard disk, mass storage, off-line storage, network attached storage, or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may include an operating system. Software 220 is also intended to include firmware, middleware, microcode, hardware description language (HDL), and/or other forms of instruction. Additionally, for example, a 5G UE device 190 may include logic to perform tasks, as described herein, based on software 220.

Communication interface 225 permits device 200 to communicate with other devices, networks, systems, devices, and/or the like. Communication interface 225 includes one or multiple radio frequency (RF) wireless interfaces and/or wired interfaces. For example, communication interface 225 may include one or multiple transmitters and receivers, or transceivers. Communication interface 225 may include one or more antennas. For example, communication interface 225 may include an array of antennas. Communication interface 225 may operate according to a protocol stack and a communication standard. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
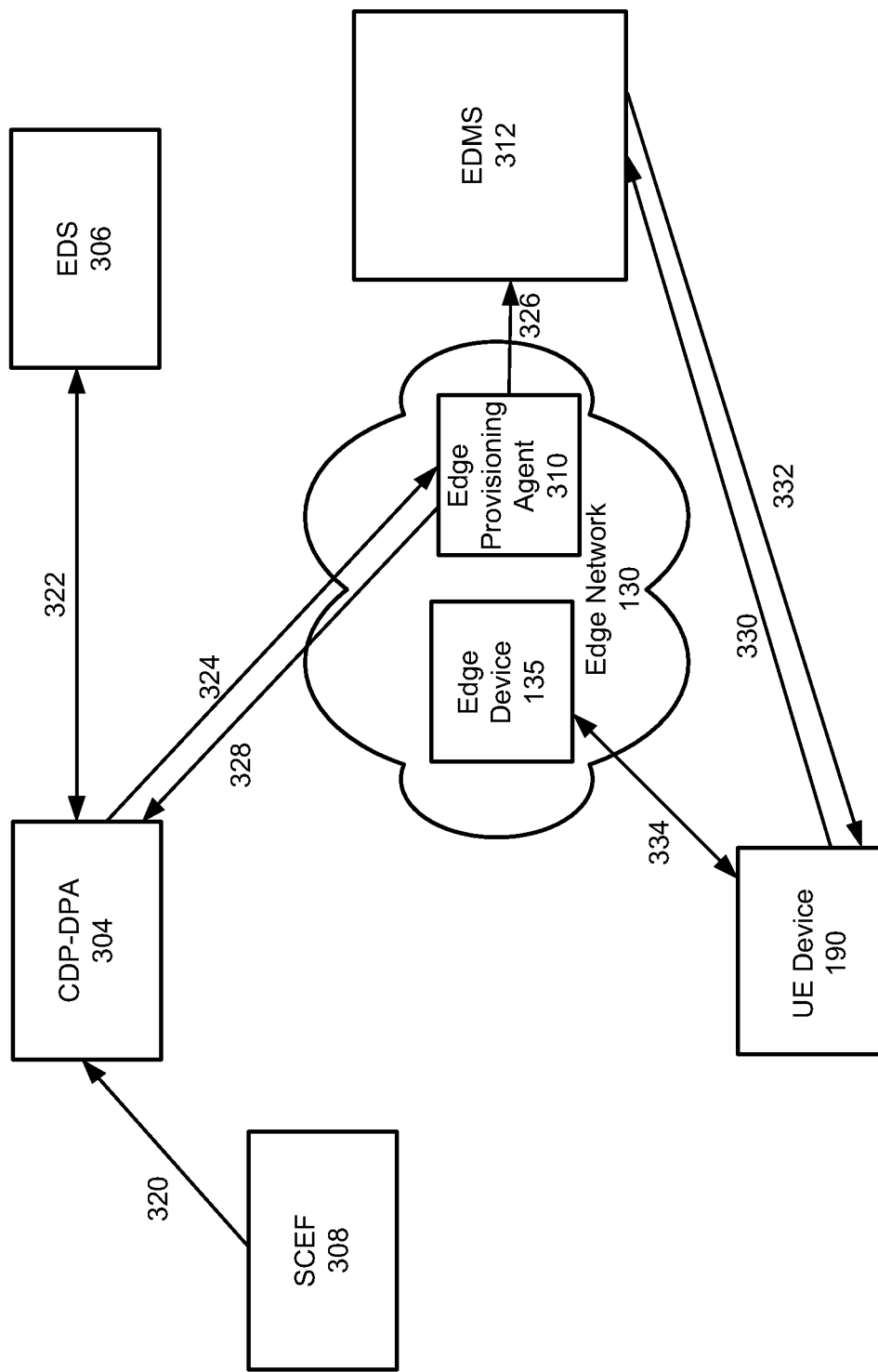
FIG. 3 is a diagram illustrating exemplary communications for configuring devices for steering traffic to an edge network, according to an implementation described herein.

FIG. 3 is a diagram illustrating exemplary communications for provisioning an EDMS to steer traffic from a user device to an edge network. FIG. 3 includes UE device 190, edge network 130, Cloud Discovery Proxy and Device Provisioning Agent (CDP-DPA) 304, Edge Discovery Service (EDS) 306, Service Capability Exposure Function (SCEF) 308, Edge Provisioning Agent 310, and EDMS 312. Communications shown in FIG. 3 provide simplified illustrations of communications and are not intended to reflect every signal or communication exchanged between devices. Furthermore, additional information not described herein may be communicated with some signals or communications. Additional devices not shown in FIG. 3 may receive and/or transmit some signals or communications not described herein.

UE device 190 may include a user device or IoT device that is authorized to utilize services provided on edge network 130. In one implementation, UE device 190 may be associated with a customer that has requested one or more services from edge network 130 be available to UE device 190. For example, a customer may subscribe to a service that allows UE device 190 to access edge network 130 for using a particular service.

SCEF 308 is a network element that may facilitate monitoring a UE device 190 or a state of UE device 190. CDP-DPA 304 is a network element that may reside on the far cloud or edge network 130 and may interact with other network elements to determine optimal edge networks 130 for servicing a UE device 190 and configure devices on edge networks 130 for providing edge services to UE devices 190.

CDP-DPA 304 may interface with and/or configure SCEF 308 to monitor a state of UE device 190 and provide asynchronous notifications when UE device 190 connects to a network associated with a communications service provider. CDP-DPA 304 may additionally configure SCEF 308 to report a status change associated with UE 190 to CDP-DPA 304. For example, if UE device 190 moves from a coverage area associated with a first edge network 130 to a coverage area associated with a second edge network 130, SCEF 308 may report the status change to CDP-DPA 304 when UE device 190 connects to a network at the new location. In addition, SCEF 308 may report location information associated with UE device 190, such an identity of an access station 115 to which UE device is connected, to CDP-DPA 304.

EDMS 312 may include a database storing DNS records associated with UE devices 190 that subscribe to edge services. EDMS 312 may support an application programming interface (API) that can be used by trusted applications for configuration. After being configured with information associated with the UE devices 190 that subscribe to edge services, EDMS 312 may intercept DNS requests from UE devices 190 and may transmit to the UE devices 190 an indication of an edge device 135 on edge network 130 to serve the UE devices 190. EDMS 312 may be located very close to where a UE device 190 may connect in order to access the service from the communications service provider. For example, EDMS 312 may be located at a Service Access Point (SAP) location.

As shown in FIG. 3, UE device 190 may connect to a network (e.g., a network associated with a communications service provider) and SCEF 308 may notify CDP-DPA 304 that the UE device 190 has connected to the network (320). SCEF 308 may additionally transmit connection or location information associated with UE device 190 (e.g., IP address, cell ID, etc.) to CDP-DPA 304. CDP-DPA 304 may interact with EDS 306 to determine an optimal edge network 130 to serve UE device 190 (322). For example, based on the location of UE device 190 and the service requested by UE device 190, EDS 306 may determine that edge network 130 is best suited to serve UE device 190 and EDS 306 may transmit an identifier associated with edge network 130 to CDP-DPA 304. The determination of the edge network 130 that is best suited to serve UE device 190 may be determined without the involvement of UE device 190 other than the requirement that UE device 190 connect to a communication service provider's network.

CDP-DPA 304 may receive the identifier associated with edge network 130 and may interact with Edge Provisioning Agent 310 in edge network 130 to ensure that service and device provisioning are complete in order to serve UE device 190 (324). For example, CDP-DPA 304 may provision one or more edge devices 135 in edge network 130 (i.e., edge devices 135) to ensure that the edge devices 135 have access to the service and that necessary information (e.g., client certificates, tokens, authorization information, etc.) has been loaded into edge devices 135 at edge network 130 to support UE device 190. In one implementation, edge device 135 may host the service. In another implementation, edge device 135 may host more than one service.

Additionally, Edge Provisioning Agent 310 may configure EDMS 312 (326). For example, Edge Provisioning Agent 310 may transmit identification and connectivity information associated with UE device 190 to EDMS 312 and EDMS 312 may store the information in a database. In one implementation, Edge Provisioning Agent 310 may transmit to EDMS 312 an identifier associated with UE device 190, an indication of the services to be provided to the UE device 190 (e.g., FQDNs or URLs needed to access the services), corresponding IP addresses associated with the services running on edge device 135 to provide the service on edge network 130 (i.e., the edge network best suited to serve UE device 190), and additional information associated with UE device 190. When edge device 135 hosts more than one service, more than one IP address may be associated with edge device 135 and each IP address may correspond to a service hosted by edge device 135. In one implementation, UE device 190 may be associated with the service based on information provided by the customer. EDMS 312 may store the information received from Edge Provisioning Agent 310 in a database (i.e., a DNS database).

In one implementation, the service provided by EDMS 312 may be distributed and each EDMS 312 may be associated with a particular edge network 130. In one implementation, the EDMS database may be dynamically updated in real time to store records of IP addresses of edge devices 135 that provide services that are hosted at edge network 130 along with the URLs or FQDNs of the services. EDMS 312 may additionally store the latest device provisioning information (e.g., device ID) to allow EDMS 312 to serve only UE devices 190 that are provisioned on the edge network 130 associated with EDMS 312.

After provisioning of edge network 130, Edge Provisioning Agent 310 may transmit a message to CDP-DPA 304 indicating that provisioning of edge network 130 has been completed (328). In one implementation, CDP-DPA 304 may additionally transmit a message (not shown) to UE device 190 indicating that the provisioning has been completed.

After the provisioning of edge network 130 and the configuration of EDMS 312 have been completed, UE device 190 may transmit a DNS request to utilize an edge service and EDMS 312 may intercept the DNS request (330). For example, UE device 190 may transmit a DNS query including an identifier associated with UE device 190 and a URL or FQDN corresponding to the service and EDMS 312 may intercept the DNS query based on the DNS request being a request for edge services. EDMS 312 may determine that UE device 190 is subscribed to utilize an edge service and may perform a lookup to determine whether the URL or FQDN in the DNS query matches the URL or FQDN corresponding to an identifier associated with UE device 190 stored at EDMS 312. When the URL or FQDN and identifier of UE device 190 are stored in a record at EDMS 312, EDMS 312 may use the record to determine a corresponding IP address of edge device 135 that provides the edge service at edge network 130. EDMS 312 may transmit the IP address of edge device 135 to UE device 190 (332). Based on receiving the IP address, UE device 190 may connect to edge device 135 to utilize the service provided at edge network 130 (334). For example, UE device 190 may access edge device 135 using the received IP address and may exchange information with edge device 135 for accessing a service.

In the implementation described above, traffic from UE device 190 may be steered to edge network 130 without changing any configurations in UE device 190. To avoid any configuration changes within UE device 190, the FQDN associated with a service may remain the same regardless of an edge network 130 from where the service is being accessed. Because EDMS 312 stores the FQDN associated with the service and the address of an edge device 135 in the edge network 130 that provides the service, by using services provided by EDMS 312, traffic from UE device 190 may automatically be steered to the correct edge network 130 without changing any configuration within UE device 190.

Figure 4:
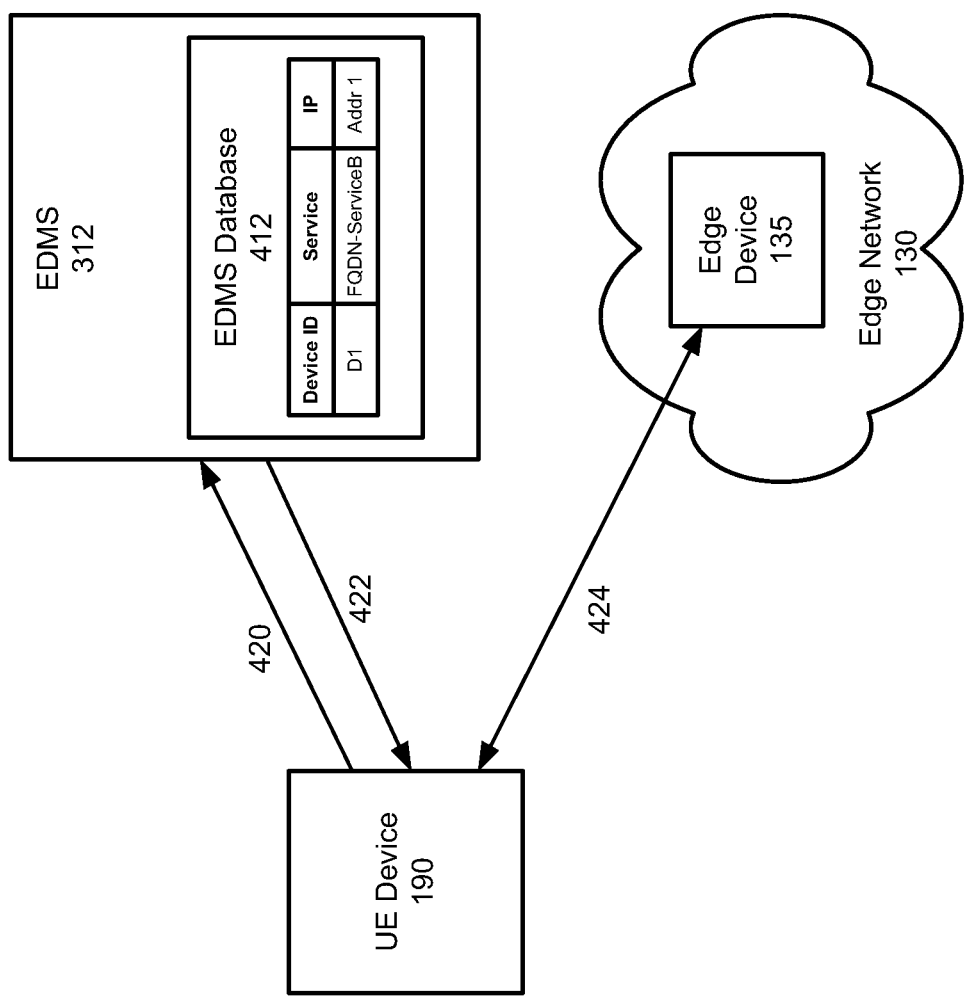
FIG. 4 is a diagram illustrating exemplary communications for steering traffic to an edge network, according to an implementation described herein.

FIG. 4 is a diagram illustrating exemplary communications for steering traffic from a user device to an edge network based on information stored at EDMS 312. FIG. 4 may include UE device 190, EDMS 312, EDMS database 412, edge network 130, and edge device 135.

In the example shown in FIG. 4, UE device 190 may subscribe to a service offered at an edge network 130 and information associated with UE device 190 and the service may be stored at EDMS database 412. For example, as shown in FIG. 4, EDMS database 412 may store an identifier associated with a UE device 190 that has signed up for edge services (e.g., D1), a URL or FQDN of a service associated with the edge service (e.g., FQDN-ServiceB), and an address (e.g., an IP address) associated with an edge device 135 in edge network 130 that is responsible for providing the service (e.g., Addr 1).

As shown in FIG. 4, UE device 190 may transmit a DNS request with an identifier associated with UE device 190 (e.g., D1) and a URL or FQDN for the edge service associated with UE device 190 (e.g., Service B) to connect with a server providing the edge service and EDMS 312 may intercept the request (420). In one implementation, EDMS 312 may intercept the request based on determining that UE device 190 is transmitting a request for an edge service. For example, EDMS 312 may process DNS requests only from UE devices 190 that are to be served from edge network 130.

EDMS 312 may perform a lookup to determine an identifier (e.g., an IP address) of edge device 135 responsible for providing Service B. For example, EDMS 312 may perform a lookup in EDMS database 412 using an identifier associated with UE device 190 (e.g., D1) and the URL or FQDN of Service B (e.g., FQDN-ServiceB) to determine an identifier associated with edge device 135 at edge network 130 to provide services associated with Service B. As shown in FIG. 4, EDMS 312 may retrieve the identifier associated with edge device 135 (e.g., Addr 1) and may transmit the identifier to UE device 190 (422). UE device 190 may receive the identifier of edge device 135 and may form a connection with edge device 135 (424). For example, UE device 190 may communicate with an application at edge device 135 and use the application for performing the service. In this way, when UE device 190 subscribes to use an edge services, UE device 190 may automatically be steered to edge device 135 using the FQDN associated with Service B and while avoiding any configuration changes to UE device 190.

In one implementation, EDMS 312 may process DNS requests only from devices that have subscribed to edge services on edge network 130 and EDMS 312 may resolve the URLs or FQDNs associated with services that are made available to UE device 190 from edge network 130. All other DNS requests may not be processed by EDMS 312 and the DNS requests may be forwarded to the core network 150. For example, if UE device 190 has not subscribed to a service at edge network 130, EDMS database 412 may not store information associated with UE device 190. In this case, a DNS request from UE device 190 may not be processed by EDMS 312.

Additionally, if UE device 190 that has previously subscribed to a service at edge network 130, but has subsequently unsubscribed from the edge service, DNS records stored in EDMS database 412 may be updated to reflect that user device 190 has unsubscribed to the service at edge network 130. In one implementation, the DNS record associated with UE device 190 may have been removed from EDMS database 412 when UE device 190 unsubscribed from the service. In another implementation, a DNS record associated with UE device 190 and the service may have been modified in EDMS database 412 to indicate that UE device 190 is no longer subscribed to the service. If UE device 190 has unsubscribed from the edge service, a DNS request from UE device 190 may not be processed by EDMS 312. If a UE device 190 has not subscribed to use edge services, DNS requests from UE device 190 may be processed by a DNS system in the far cloud.

Figure 5:
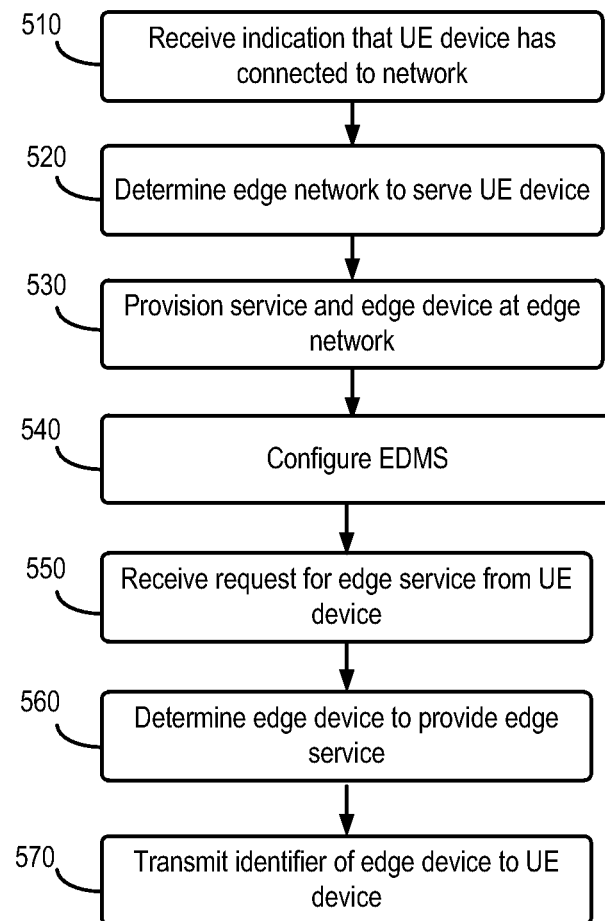
FIG. 5 is a flow diagram illustrating an exemplary method of configuring devices for steering traffic to an edge, according to an implementation described herein.

FIG. 5 is a flow diagram illustrating an exemplary method of configuring EDMS 312 for traffic steering and steering traffic to an edge device 135. The method of FIG. 5 may be performed, for example, by UE device 190, CDP-DPA 304, EDS 306, SCEF 308, Edge Provisioning Agent 310, EDMS 312, edge device 135, and/or additional or different elements of environment 100.

In the example described with respect to FIG. 5, UE device 190 may have subscribed to a use an edge service and UE device 190 may be associated with the edge service to be provided by an edge device 135. The method of FIG. 5 may begin with CDP-DPA 304 receiving an indication that UE device 190 has connected to a network (block 510). For example, SCEF 308 may transmit a message to CDP-DPA 304 indicating that UE device 190 has connected to the network (e.g., access network 110). SCEF 308 may additionally transmit information associated with UE device 190, such as an identifier associated with UE device 190 (e.g., an IP address), an identity of anchor point in the network where UE device 190 has connected (e.g., a cell identifier), and/or additional information.

Based on the information received from SCEF 308, CDP-DPA 304 may interact with EDS 306 to determine the edge network 130 to best serve UE device 190 (block 520). For example, EDS 306 may identify an edge network 130 that is best suited to provide the service associated with UE device 190 based on a number of factors (e.g., network workload, radio congestion, etc.). In one implementation, the edge network 130 that is best suited to provide the service associated with UE device 190 may be in close proximity to the anchor point where UE device 190 connected to the network. In another implementation, the edge network 130 closest to the anchor point may not provide the best performance for UE device 190. EDS 306 may transmit to CDP-DPA 304 an identifier associated with the edge network 130 and/or an edge device 135 in edge network 130 to provide the service.

CDP-DPA 304 may interact with Edge Provisioning Agent 310 to provision edge device 135 to serve UE device 190 (block 530). In one implementation, Edge Provisioning Agent 310 may be located in edge network 130. Edge Provisioning Agent 310 may, for example, ensure that edge device 135 has access to the service required by UE device 190 and that any necessary information associated with UE device 190 (e.g., client certificates, tokens, authentication information, etc.) is stored at or accessible by edge device 135 to support UE device 190.

Edge Provisioning Agent 310 may configure EDMS 312 (block 540). In one implementation, EDMS 312 may be associated with edge network 130 and may store information associated with UE devices 190 that access edge services from edge devices 135 at edge network 130. Edge Provisioning Agent 310 may transmit information associated with UE device 190 and the edge service associated with UE device 190 to EDMS 312. In one implementation, the information may include an identifier associated with UE device 190, a URL or FQDN associated with the service (i.e., the URL or FQDN used by UE device 190 to request the service), and an identifier of the edge device 135 at edge network 130 to provide the service. EDMS 312 may store the information in EDMS database 412. Edge Provisioning Agent 310 may notify CDP-DPA 304 when the provisioning of edge device 135 and EDMS 312 is completed. In one implementation, CDP-DPA 304 may notify UE device 190 when the provisioning is complete and UE device 190 may access the edge services from edge device 135.

After provisioning has been completed, UE device 190 may initiate a request to access the edge service and EDMS 312 may receive the request (block 550). For example, based on determining that the request is a request for an edge service, EDMS 312 may intercept the request. EDMS 312 may perform a lookup in EDMS database 412 using an identifier associated with UE device 190 and an URL or FQDN of the service in the request to determine an identifier of edge device 135 to provide the service (block 560). For example, EDMS 312 may identify an IP address associated with the edge device 135 that is responsible for providing the service. EDMS 312 may transmit the identifier associated with edge device 135 to UE device 190 (block 570). Based on receiving the identifier, UE device 190 may connect to edge device 135 to receive the edge service.

By using EDMS 312, UE device 190 may access edge services using a URL or FQDN associated with the service. EDMS 312 may identify the edge device 135 best suited to provide the edge service to UE device 190 and may steer UE device 190 traffic to the edge device 135 based on a request that includes the URL or FQDN of the service. In this way, UE device 190 may access the edge services while avoiding configuration changes to UE device 190.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 5, and series of signal flows have been described with respect to FIGS. 3 and 4, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   storing, at a network device, a user device identifier associated with a user device that has subscribed to access an edge service, an edge service identifier associated with the edge service, and an edge device identifier associated with an edge device at an edge network to provide the edge service;
   receiving, at the network device, a request to access the edge service, wherein the request includes the user device identifier and the edge service identifier;
   performing, by the network device, a lookup to determine the edge device identifier; and
   transmitting, by the network device and to the user device, the edge device identifier for accessing the edge service at the edge device.

2. The method of claim 1, further comprising:
   receiving an indication that the user device has connected to a network and a location where the user device has connected to the network; and
   identifying, based on the location, the edge network to provide the edge service,
   wherein storing the edge device identifier at the edge network includes:
      storing, based on identifying the edge network, the edge device identifier.

3. The method of claim 2, wherein identifying the edge network to provide the edge service includes identifying the edge network based on the location where the user device has connected to the network.

4. The method of claim 2, further comprising:
   configuring a Service Capability Exposure Function (SCEF) device to monitor a status and location of the user device, and
   wherein the indication that the user device has connected to the network is received from the SCEF and further includes the location where the user device has connected to the network.

5. The method of claim 1, wherein the network device stores records associated with edge services provided on the edge network and user devices that have subscribed to access the edge services from the edge network.

6. The method of claim 1, wherein the edge service identifier includes a fully qualified domain name (FQDN) associated with the edge service and the edge device identifier includes an Internet Protocol (IP) address associated with the edge device.

7. The method of claim 1, further comprising:
   provisioning the edge device at the edge network to provide the edge service.

8. A system comprising:
   one or more processors configured to:
      store, in a database, a user device identifier associated with a user device that has subscribed to access an edge service, an edge service identifier associated with the edge service, and an edge device identifier associated with an edge device at an edge network to provide the edge service;
      receive a request to access the edge service, wherein the request includes the user device identifier and the edge service identifier;
      perform a lookup to determine the edge device identifier; and
      transmit, to the user device, the edge device identifier for accessing the edge service at the edge device.

9. The system of claim 8, wherein the one or more processors are further configured to:
   receive an indication that the user device has connected to a network and a location where the user device has connected to the network; and
   identify, based on the location, the edge network to provide the edge service,
   wherein, when storing the edge device identifier at the edge network, the one or more processors are further configured to:
      store, based on identifying the edge network, the edge device identifier.

10. The system of claim 9, wherein, when identifying the edge network to provide the edge service, the one or more processors are further configured to identify the edge network based on the location where the user device has connected to the network.

11. The system of claim 9, wherein the one or more processors are further configured to:
   configure a Service Capability Exposure Function (SCEF) device to monitor a status and location of the user device, and wherein the indication that the user device has connected to the network is received from the SCEF and further includes the location where the user device has connected to the network.

12. The system of claim 8, wherein the database stores records associated with edge services provided on the edge network and user devices that have subscribed to access the edge services from the edge network.

13. The system of claim 8, wherein the edge service identifier includes a fully qualified domain name (FQDN) associated with the edge service and the edge device identifier includes an Internet Protocol (IP) address associated with the edge device.

14. The system of claim 8, wherein the one or more processors are further configured to:
provision the edge device at the edge network to provide the edge service.

15. A non-transitory computer-readable memory device storing instructions executable by one or more processors, the instructions comprising:
one or more instructions that, when executed, cause the one or more processors to:
store, in a database, a user device identifier associated with a user device that has subscribed to access an edge service, an edge service identifier associated with the edge service, and an edge device identifier associated with an edge device at an edge network to provide the edge service;
receive a request to access the edge service, wherein the request includes the user device identifier and the edge service identifier;
perform a lookup to determine the edge device identifier; and
transmit, to the user device, the edge device identifier for accessing the edge service at the edge device.

16. The non-transitory computer-readable memory device of claim 15, wherein the instructions further comprise one or more instructions that cause the one or more processors to:
receive an indication that the user device has connected to a network and a location where the user device has connected to the network; and
identify, based on the location, the edge network to provide the edge service,
wherein the one or more instructions that cause the one or more processors to store the edge device identifier at the edge network include one or more instructions that cause the one or more processors to:
store, based on identifying the edge network, the edge device identifier.

17. The non-transitory computer-readable memory device of claim 16, wherein the one or more instructions that cause the one or more processors to identify the edge network to provide the edge service include one or more instructions that cause the one or more processors to identify the edge network based on the location where the user device has connected to the network.

18. The non-transitory computer-readable memory device of claim 16, wherein the instructions further comprise one or more instructions that cause the one or more processors to:
configure a Service Capability Exposure Function (SCEF) device to monitor a status and location of the user device, and wherein the indication that the user device has connected to the network is received from the SCEF and further includes the location where the user device has connected to the network.

19. The non-transitory computer-readable memory device of claim 15, wherein the database stores records associated with edge services provided on the edge network and user devices that have subscribed to access the edge services from the edge network.

20. The non-transitory computer-readable memory device of claim 15, wherein the edge service identifier includes a fully qualified domain name (FQDN) associated with the edge service and the edge device identifier includes an Internet Protocol (IP) address associated with the edge device.

* * * * *